(12) United States Patent
McKillican et al.

(10) Patent No.: US 9,085,310 B2
(45) Date of Patent: Jul. 21, 2015

(54) METHOD OF DETERMINING THE POSITION OF A VEHICLE MOVING ALONG A GUIDEWAY

(75) Inventors: Boyd McKillican, Vaughan (CA); Abe Kanner, Mississauga (CA)

(73) Assignee: THALES CANADA INC., Toronto, Ontario (CA)

( * ) Notice: Subject to any disclaimer, the term of this patent is extended or adjusted under 35 U.S.C. 154(b) by 1050 days.

(21) Appl. No.: 13/115,425

(22) Filed: May 25, 2011

(65) Prior Publication Data

US 2012/0299777 A1 Nov. 29, 2012

(51) Int. Cl.
| | |
|---|---|
| *B61L 25/02* | (2006.01) |
| *G01S 5/02* | (2010.01) |
| *G01S 5/08* | (2006.01) |
| *G01S 5/14* | (2006.01) |
| *G01S 13/87* | (2006.01) |
| *B61L 3/12* | (2006.01) |

(52) U.S. Cl.
CPC ............... *B61L 25/025* (2013.01); *G01S 5/02* (2013.01); *G01S 5/08* (2013.01); *G01S 5/14* (2013.01); *G01S 13/876* (2013.01); *B61L 3/125* (2013.01)

(58) Field of Classification Search
CPC ..... B61L 25/025; B61L 25/026; B61L 3/125; B61L 2027/005; G01S 5/02; G01S 5/08; G01S 5/14; G01S 13/876
USPC ........................................ 246/122 R; 701/19
See application file for complete search history.

(56) References Cited

U.S. PATENT DOCUMENTS

| | | | |
|---|---|---|---|
| 3,714,573 A * | 1/1973 | Grossman | 342/387 |
| 5,227,803 A | 7/1993 | O'Connor et al. | |
| 5,420,883 A * | 5/1995 | Swensen et al. | 375/138 |
| 5,803,411 A * | 9/1998 | Ackerman et al. | 246/169 R |
| 5,954,780 A * | 9/1999 | Jang | 701/93 |
| 6,072,421 A | 6/2000 | Fukae et al. | |
| 6,195,023 B1 * | 2/2001 | Walsh et al. | 340/988 |
| 6,587,763 B2 * | 7/2003 | Ishikawa | 701/19 |
| 6,666,411 B1 * | 12/2003 | Hart et al. | 246/62 |

(Continued)

FOREIGN PATENT DOCUMENTS

| | | | | |
|---|---|---|---|---|
| DE | WO 2009/141251 | * 11/2009 | | B61L 1/14 |
| EP | 0242983 A3 | 10/1987 | | |

(Continued)

OTHER PUBLICATIONS

He Peng, "Research on Urban Railway Knowledge-based CBTC System". School of Urban Rail Transportation, Shanghai University of Engineering Science, China.

*Primary Examiner* — Zachary Kuhfuss
(74) *Attorney, Agent, or Firm* — Marks & Clerk; Richard J. Mitchell

(57) ABSTRACT

A method of determining the position of a vehicle moving along a guideway is disclosed wherein signals from groups of transponders located beside the guideway are detected as the vehicle moves along the guideway to create a footprint in the time domain corresponding to the time the vehicle is in communication with that transponder. The transponders of each group are spaced a known distance apart from each other. An estimate of the position of the moving vehicle is computed by matching the point in the time domain that bears the same geometric relationship to the footprints corresponding to the transponders of the group to a point in the spatial domain that bears a known geometric relationship with the transponders of each group.

19 Claims, 4 Drawing Sheets

(56) References Cited

U.S. PATENT DOCUMENTS

| | | | |
|---|---|---|---|
| 7,205,939 B2* | 4/2007 | Zimmerman | 342/464 |
| 7,269,487 B2* | 9/2007 | Watanabe et al. | 701/19 |
| 7,271,766 B2* | 9/2007 | Zimmerman et al. | 342/464 |
| 7,315,278 B1* | 1/2008 | Bauregger et al. | 342/357.27 |
| 7,339,524 B2* | 3/2008 | Zimmerman et al. | 342/458 |
| 7,339,525 B2* | 3/2008 | Zimmerman et al. | 342/464 |
| 7,339,526 B2* | 3/2008 | Zimmerman | 342/464 |
| 7,342,538 B2* | 3/2008 | Zimmerman | 342/464 |
| 7,345,627 B2* | 3/2008 | Zimmerman et al. | 342/357.27 |
| 7,382,318 B2* | 6/2008 | Zimmerman et al. | 342/464 |
| 7,426,424 B2* | 9/2008 | Moriguchi | 700/214 |
| 7,433,766 B2* | 10/2008 | Ruckser | 701/19 |
| 7,532,160 B1* | 5/2009 | Zimmerman et al. | 342/357.27 |
| 8,467,920 B2* | 6/2013 | Asuka et al. | 701/19 |
| 8,469,318 B2* | 6/2013 | Kaluscha | 246/122 R |
| 8,477,067 B2* | 7/2013 | Kanner | 342/357.29 |
| 8,651,433 B2* | 2/2014 | Ghaly | 246/167 R |
| 8,755,425 B2* | 6/2014 | Morris et al. | 375/141 |
| 8,913,647 B2* | 12/2014 | Beeler et al. | 375/140 |
| 8,934,579 B2* | 1/2015 | Ward | 375/340 |
| 2002/0109049 A1* | 8/2002 | Alacoque et al. | 246/122 R |
| 2005/0010338 A1* | 1/2005 | Kraeling et al. | 701/19 |
| 2005/0137760 A1* | 6/2005 | Watanabe et al. | 701/19 |
| 2005/0203699 A1* | 9/2005 | Moriguchi | 701/200 |
| 2008/0123111 A1* | 5/2008 | Hori | 356/620 |
| 2011/0127388 A1* | 6/2011 | Kaluscha | 246/122 R |
| 2012/0018591 A1 | 1/2012 | Ghaly | |
| 2012/0153089 A1* | 6/2012 | Galm et al. | 246/122 R |
| 2012/0325979 A1* | 12/2012 | Yoon | 246/122 R |
| 2012/0326916 A1* | 12/2012 | Kanner et al. | 342/44 |
| 2012/0326924 A1* | 12/2012 | Kanner | 342/357.31 |

FOREIGN PATENT DOCUMENTS

| | | |
|---|---|---|
| JP | 09301176 A | 11/1997 |
| WO | 2009139927 A2 | 11/2009 |

* cited by examiner

FIRST TAG AT P = 0.00m, SECOND TAG AT S = 5.00 m

WHAT IS THE MIDPOINT OF THE T1 LOCK VALLEY?

| RS ▼ PQ ► | 0.30 | 0.35 | 0.40 | 0.45 | 0.50 | 0.55 | 0.60 | 0.65 | 0.70 | 0.75 | 0.80 | 0.85 | 0.90 |
|---|---|---|---|---|---|---|---|---|---|---|---|---|---|
| 0.30 | 2.50 | 2.53 | 2.55 | 2.58 | 2.60 | 2.63 | 2.65 | 2.68 | 2.70 | 2.73 | 2.75 | 2.78 | 2.80 |
| 0.35 | 2.48 | 2.50 | 2.53 | 2.55 | 2.58 | 2.60 | 2.63 | 2.65 | 2.68 | 2.70 | 2.73 | 2.75 | 2.78 |
| 0.40 | 2.45 | 2.48 | 2.50 | 2.53 | 2.55 | 2.58 | 2.60 | 2.63 | 2.65 | 2.68 | 2.70 | 2.73 | 2.75 |
| 0.45 | 2.43 | 2.45 | 2.48 | 2.50 | 2.53 | 2.55 | 2.58 | 2.60 | 2.63 | 2.65 | 2.68 | 2.70 | 2.73 |
| 0.50 | 2.40 | 2.43 | 2.45 | 2.48 | 2.50 | 2.53 | 2.55 | 2.58 | 2.60 | 2.63 | 2.65 | 2.68 | 2.70 |
| 0.55 | 2.38 | 2.40 | 2.43 | 2.45 | 2.48 | 2.50 | 2.53 | 2.55 | 2.58 | 2.60 | 2.63 | 2.65 | 2.68 |
| 0.60 | 2.35 | 2.38 | 2.40 | 2.43 | 2.45 | 2.48 | 2.50 | 2.53 | 2.55 | 2.58 | 2.60 | 2.63 | 2.65 |
| 0.65 | 2.33 | 2.35 | 2.38 | 2.40 | 2.43 | 2.45 | 2.48 | 2.50 | 2.53 | 2.55 | 2.58 | 2.60 | 2.63 |
| 0.70 | 2.30 | 2.33 | 2.35 | 2.38 | 2.40 | 2.43 | 2.45 | 2.48 | 2.50 | 2.53 | 2.55 | 2.58 | 2.60 |
| 0.75 | 2.28 | 2.30 | 2.33 | 2.35 | 2.38 | 2.40 | 2.43 | 2.45 | 2.48 | 2.50 | 2.53 | 2.55 | 2.58 |
| 0.80 | 2.25 | 2.28 | 2.30 | 2.33 | 2.35 | 2.38 | 2.40 | 2.43 | 2.45 | 2.48 | 2.50 | 2.53 | 2.55 |
| 0.85 | 2.23 | 2.25 | 2.28 | 2.30 | 2.33 | 2.35 | 2.38 | 2.40 | 2.43 | 2.45 | 2.48 | 2.50 | 2.53 |
| 0.90 | 2.20 | 2.23 | 2.25 | 2.28 | 2.30 | 2.33 | 2.35 | 2.38 | 2.40 | 2.43 | 2.45 | 2.48 | 2.50 |

| min | 2.20 |
|---|---|
| max | 2.80 |
| avg | 2.50 |

HOW FAR IS THE MIDPOINT OF THE T1 LOCK VALLEY FROM THE MIDPOINT OF TAGS?

| RS ▼ PQ ▶ | 0.30 | 0.35 | 0.40 | 0.45 | 0.50 | 0.55 | 0.60 | 0.65 | 0.70 | 0.75 | 0.80 | 0.85 | 0.90 |
|---|---|---|---|---|---|---|---|---|---|---|---|---|---|
| 0.30 | 0.00 | -0.03 | -0.05 | -0.08 | -0.10 | -0.13 | -0.15 | -0.18 | -0.20 | -0.23 | -0.25 | -0.28 | -0.30 |
| 0.35 | 0.02 | 0.00 | -0.02 | -0.05 | -0.08 | -0.10 | -0.13 | -0.15 | -0.18 | -0.20 | -0.23 | -0.25 | -0.28 |
| 0.40 | 0.05 | 0.02 | 0.00 | -0.02 | -0.05 | -0.07 | -0.10 | -0.13 | -0.15 | -0.18 | -0.20 | -0.23 | -0.25 |
| 0.45 | 0.08 | 0.05 | 0.03 | 0.00 | -0.02 | -0.05 | -0.07 | -0.10 | -0.13 | -0.15 | -0.18 | -0.20 | -0.23 |
| 0.50 | 0.10 | 0.07 | 0.05 | 0.03 | 0.00 | -0.02 | -0.05 | -0.08 | -0.10 | -0.13 | -0.15 | -0.18 | -0.20 |
| 0.55 | 0.13 | 0.10 | 0.08 | 0.05 | 0.02 | 0.00 | -0.02 | -0.05 | -0.08 | -0.10 | -0.13 | -0.15 | -0.18 |
| 0.60 | 0.15 | 0.13 | 0.10 | 0.08 | 0.05 | 0.02 | 0.00 | -0.03 | -0.05 | -0.08 | -0.10 | -0.13 | -0.15 |
| 0.65 | 0.18 | 0.15 | 0.13 | 0.10 | 0.08 | 0.05 | 0.03 | 0.00 | -0.02 | -0.05 | -0.07 | -0.10 | -0.13 |
| 0.70 | 0.20 | 0.18 | 0.15 | 0.13 | 0.10 | 0.08 | 0.05 | 0.02 | 0.00 | -0.02 | -0.05 | -0.08 | -0.10 |
| 0.75 | 0.23 | 0.20 | 0.18 | 0.15 | 0.13 | 0.10 | 0.08 | 0.05 | 0.02 | 0.00 | -0.02 | -0.05 | -0.08 |
| 0.80 | 0.25 | 0.23 | 0.20 | 0.18 | 0.15 | 0.13 | 0.10 | 0.07 | 0.05 | 0.02 | 0.00 | -0.03 | -0.05 |
| 0.85 | 0.28 | 0.25 | 0.23 | 0.20 | 0.18 | 0.15 | 0.13 | 0.10 | 0.08 | 0.05 | 0.03 | 0.00 | -0.03 |
| 0.90 | 0.30 | 0.28 | 0.25 | 0.23 | 0.20 | 0.18 | 0.15 | 0.13 | 0.10 | 0.08 | 0.05 | 0.02 | 0.00 |

| min | -0.30 |
|---|---|
| max | 0.30 |
| avg | 0.00 |

METHOD OF DETERMINING THE POSITION OF A VEHICLE MOVING ALONG A GUIDEWAY

FIELD OF THE INVENTION

This invention relates to the field of transportation, and in particular to a method of determining the position of a vehicle, such as a train, moving along a guideway, such as a track.

BACKGROUND OF THE INVENTION

The invention will be discussed in the context of trains for convenience, although it will be appreciated it is applicable to other systems, such as monorails the like, wherein a vehicle moves along a guideway.

As trains become more automated, there is a need to determine their position with a high degree of accuracy. This is particularly the case when the train stops at a platform, for example.

One system currently in use is known as the Transcore™ system as used in Seltrac. This employs transponders spaced along the track and a detector, known as an interrogator, on the train. Each train is controlled by a VOBC (or Very Intelligent On-board Controller). As the train moves past a transponder it picks up signals that provide two data outputs, namely a serial channel indicating the ID of the transponder and a digital output indicating when the interrogator is in communication with a transponder. The area above the transponder in the time domain where communication is possible is known as the transponder's footprint.

The Transcore system as used in Seltrac is based on matching the timing of the transponder's ID to the transponder's known position. However, this leads to a nominal positioning accuracy of +/−400 mm, which is insufficient for some purposes, such as accurately stopping of a train in a station.

A possible solution, which does not form part of the prior art, would be to observe the footprint and bisect it in order to get better positioning accuracy. This approach would be better than the currently implemented solution; however it assumes that the footprint, known in the Transcore system as TI Lock signal, is symmetrical about the physical centre of the transponder. Unfortunately, this is not exactly the case. The TI Lock centre may deviate by −322 to +390 mm in the nominal case from the transponder's physical centre. This is called the "Centre Deviation". These values were observed during testing, so they could be higher in other situations. Using a three-sigma approach assuming normal distribution, 99.7% of centre deviations would be between −331 and 329 mm. There is also the possibility that electromagnetic interference can distort the TI lock signal.

SUMMARY OF THE INVENTION

According to the present invention there is provided a method of determining the position of a vehicle moving along a guideway, comprising detecting signals from groups of transponders located beside the guideway as the vehicle moves along the guideway, the transponders of each group being spaced a known distance apart from each other, wherein the signals from each transponder create a footprint in the time domain corresponding to the time the vehicle is in communication with that transponder; identifying a point in the spatial domain that bears a known geometric relationship with the transponders of each group; and computing an estimate of the position of the moving vehicle by matching the point in the time domain that bears the same geometric relationship to the footprints corresponding to the transponders of the group to the point in the spatial domain.

Each groups can consist of two (a pair) or more (n-tuples) of tags.

The present invention turns the detection accuracy weakness in the Transcore system into a strength. If the TI Lock signal, namely the signal picked up be the transponders, is observed over, for example, two transponders, also known as tags, spaced for example 4 m apart, the signal (footprint) will rise, fall, rise and fall again. This sequence confirms that we traversed two tags. The IDs can be assigned such that it is clear (either by on-board database lookup or within the ID coding scheme itself) that they are each a part of the desired "binary tag". Instead of bisecting the TI Lock signal while over a tag, in one embodiment the invention bisects the midpoint of the area where the TI Lock is low between the two tags ("the valley").

More generally, there could be more than two transponders in each group, and the detection point need not necessarily be the midpoint between the footprints as long as the geometrical relationship is known. For example, it could be the ⅔ point between the footprints.

In another aspect the invention provides a guideway-mounted system for determining the position of a vehicle moving along a guideway wherein transponders are located beside a guideway such a detector on the moving vehicle generates signals that create a footprint in the time domain corresponding to the time the vehicle is in communication with that transponder, and wherein the transponders are arranged in groups such that as a vehicle moves along the guideway it is able to compute an estimate of position by matching a point in the spatial domain that bears a known geometric relationship with the transponders of each group with a point in the time domain that bears the same geometric relationship to the footprints corresponding to the transponders of the group.

BRIEF DESCRIPTION OF THE DRAWINGS

The invention will now be described in more detail, by way of example only, with reference to the accompanying drawings, in which:—

FIG. 4 is a table showing the theoretical positioning error of midpoint of the valley relative to the physical midpoint of the tags.

DETAILED DESCRIPTION OF THE INVENTION

Figure 1:
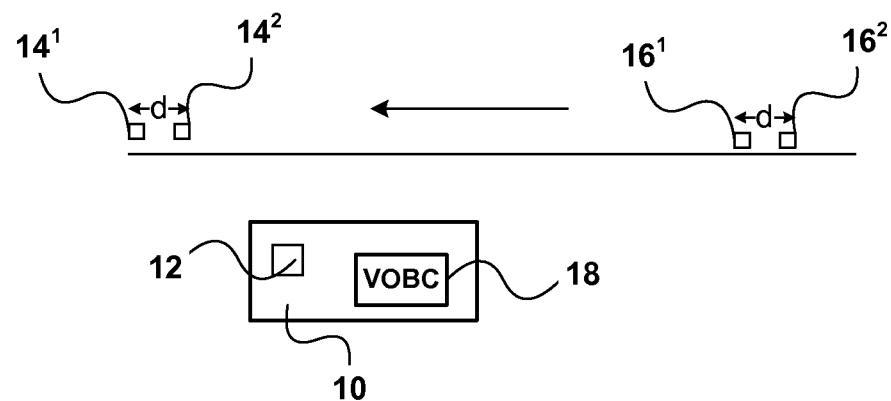
FIG. 1 is a diagram of a guideway.

In FIG. 1, train 10 carrying interrogator 12 and VOBC (Vehicle On-Board Controller 18) moves along guideway 20. In this embodiment, the transponders are arranged in pairs 14$^1$, 14$^2$, 16$^1$, 16$^2$ along the guideway 20. As the train moves along the guideway, it picks up radio frequency signals from the transponders, also referred to as tags. Each of the transponders of the pair are spaced a distance d apart. The distance can be the same for each pair, or it can vary so long as it is known.

FIGS. 2a to 2d shows what happens when an interrogator 12 passes a pair of transponders 14$^1$, 14$^2$. The diagrams represent the signals in the time domain. Each pulse or footprint 22, which corresponds to the period when the interrogator is picking up a signal, is known as a footprint. The size of the footprints can vary (they can stretch or be compressed), as shown in the diagrams a to d, due to variability of the RF or other reasons. Moreover, they may be displaced relative to their nominal position.

Figure 2:
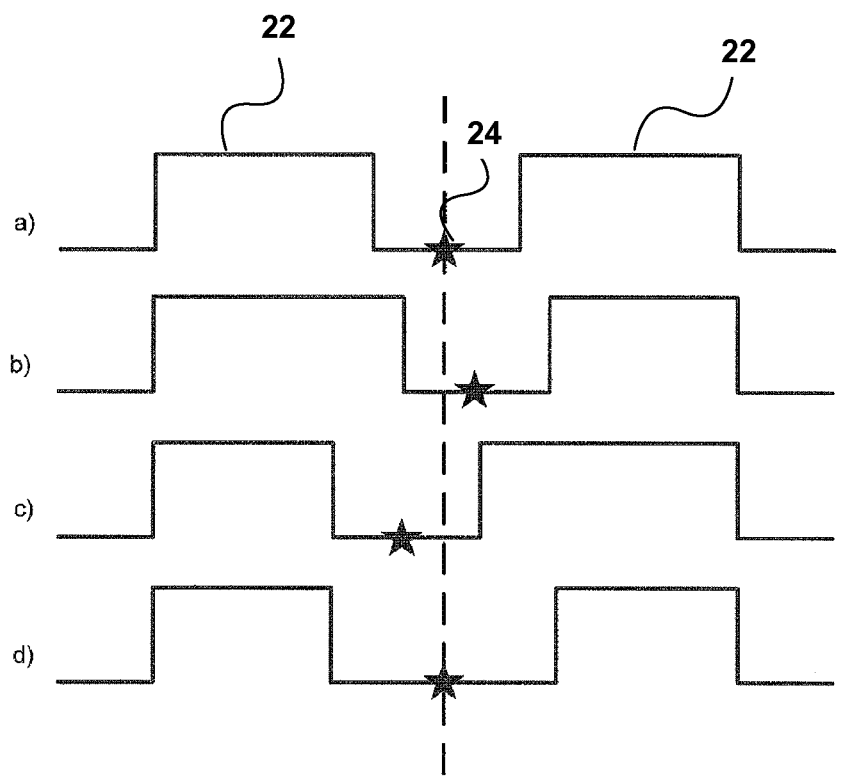
FIGS. 2a to 2d are timing diagrams showing the signals, known as T1 Lock signals, from the transponders in the time domain.
Figure 3:
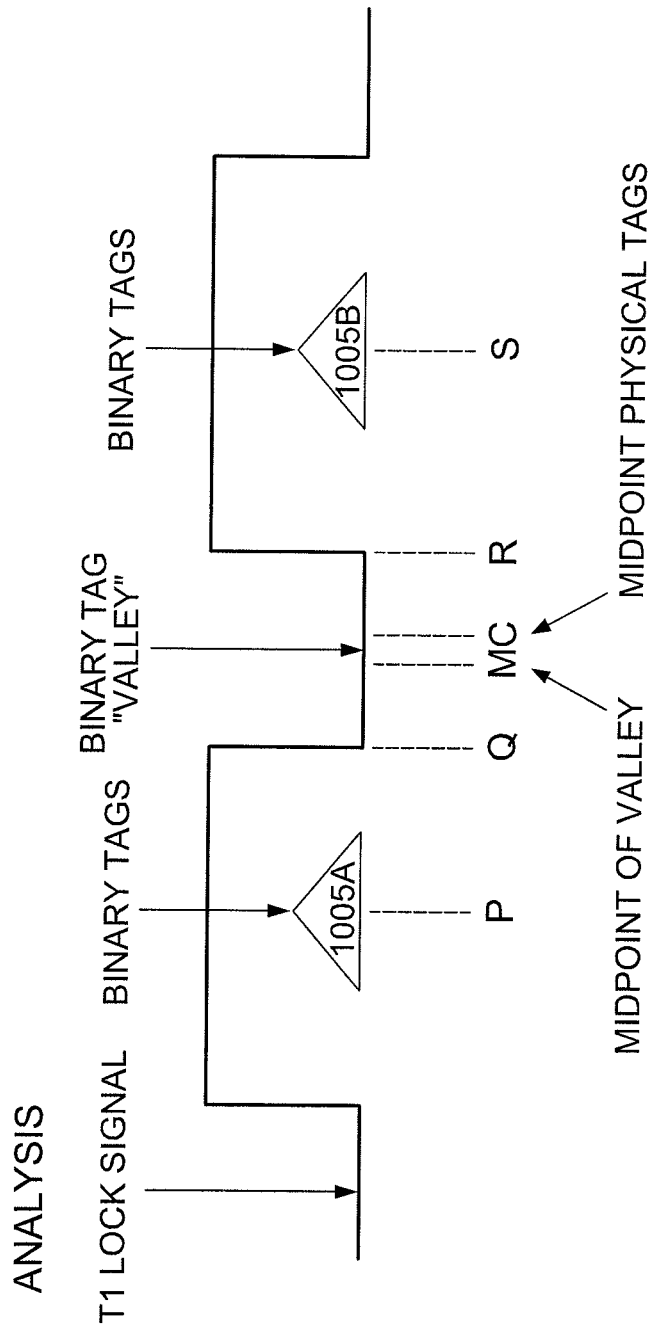
FIG. 3 shows an exemplary footprint.

In the case shown in FIG. 2a, the footprints are symmetrical, and the midpoint between them corresponds exactly to the physical midpoint between the transponders of a pair. Thus, by knowing the position of the transponders, and the distance between them, the midpoint between the footprints can be matched to the midpoint between the transponders in order to compute an accurate position of the train.

In FIG. 2d, the first footprint falls off sooner, and the second footprint falls off later, but the midpoint in the time domain still coincides with the physical midpoint of the transponders. In both cases, 2a and 2d, the positioning error is zero.

In FIG. 2b, the first footprint falls off later than normal, whereas the second footprint rises later than normal, whereas the opposite is the case for FIG. 2c. The footprints are thus asymmetrical and the midpoint 24 between them in the time domain does not correspond exactly to the physical midpoint. There is thus a small positioning error. However, this is reduced because any variability in the individual footprints is averaged, or roughly halved, over two transponders. Since the variability is random, not systematic, the average error of the two random footprints will be less than the variability associated with any one of those tags, i.e.

$$(x_1 + x_2)/2 \leq \max(x_1, x_2)$$

Only the tags associated with locations where additional positioning accuracy is required, for example, at stations, need be replaced by the binary or pairs of tags. For non-critical locations, the existing solution involving single tags (transponders) can be employed.

The existing VOBC controllers 18 need to be modified to add signal processing to the T1 Lock signal (footprint) picked up by the interrogator 12 from the transponders $14^1$, $14^2$ to remove noise and determine the desired footprint measurements. The VOBC controllers 18 are configured to implement the following algorithm on the processed signal:

Let
P=physical centre of the first tag (the origin)
Q=the falling edge of TI Lock associated with the first tag
R=the rising edge of TI Lock associated with the second tag
S=physical centre of the second tag
M=the valley midpoint
C=the midpoint of the physical tags
Then:
The midpoint of the TI Lock valley is:

$$M = PQ + QR/2$$
$$= PQ + [(PS - RS) - PQ]/2$$

and the physical centre of the tags is:

$$C = PS/2$$

This value, which is computed by VOBC 18, is used as the reference location for the position of the train.

The positioning error, E, is the deviation of the midpoint of the TI Lock valley, M, from the midpoint of the physical tags, C. Negative error means the perceived position comes before the actual position.

$$E = C - M$$
$$= PS/2 - (PQ + QR/2)$$

It can be shown that the positioning error, E, is independent of PS; however PS must be known for each binary tag to calculate the midpoint, M, which the VOBC would need as a reference point. A fixed distance can be selected for PS, or the values could be stored in a database.

$$E = C - M$$
$$= PS/2 - (PQ + QR/2)$$
$$= PS/2 - \{PQ + [(PS - RS) - PQ]/2\}$$
$$= PS/2 - PQ - PS/2 + RS/2 + PQ/2;$$
PS terms cancel
$$= (RS - PQ)/2$$

Regardless of the footprint size the binary tag (transponder pair) produces a maximum positioning error in the VOBS 18 due to detection accuracy of +/−300 mm, but values this high would be unexpected.

Given a reasonable positioning error of +/−1.8 m, only half-footprint sizes of up to 900 mm are required since the interrogator does not perceive the tags' positions perfectly and the footprints are not perfectly symmetrical or centered.

Three-sigma analysis of observed footprint sizes shows that 99.7% of half-footprints are less than 768 mm, giving a maximum positioning error of +/−250 mm from the table shown in FIG. 4.

This may be a somewhat surprising result, the reason being that the positioning error for each tag is minimized by the fact we are comparing the valley midpoint to the middle of two physical tags, which effectively cuts the error in half. Secondly, for nominal values, given the close to normal distribution of both footprint sizes, this increases the chances significantly of having a footprint size error near the mean for both tags and thus a positioning error near the mean of the second table, i.e. zero, because the errors will be randomly and normally distributed about two tags, rather than one. This benefit is not readily visible in the table.

Furthermore, using this binary tag, the train's travel direction can be determined or checked in a very short distance, rather than having to travel up to 150 meters to traverse a second tag.

The above calculations are performed assuming perfect sampling and processing of the TI Lock signal. In reality, at 80 km/h each millisecond of delay in sampling the signal will result in up to 11 mm. of positioning error.

By carefully selecting tags that have footprint sizes from the random population, the positioning error can be further minimized. Also, it is possible to average all four transitions, rising and falling edge for each footprint, to reduce the positioning error even further.

As noted, the invention has been described in connection with a binary system, two tags, but it could also be applied to triplets and higher order systems.

The invention claimed is:
1. A method of determining a position of a vehicle moving along a guideway, comprising:
detecting signals from each of a plurality of localized groups of transponders located beside the guideway as the vehicle moves along the guideway, each localized group being located at a detection location, the individual transponders within each said localized group being spaced a known distance apart from each other, said localized groups being spaced substantially further apart from each other than the individual transponders within each said localized group, wherein as the vehicle passes a current said detection location, the signals from each transponder within the localized group at the current detection location create a footprint in a time domain corresponding to a time the vehicle is in communication with that transponder;

identifying a point in a spatial domain between the transponders that bears a known geometric relationship with the transponders of each localized group; and computing an estimate of the position of the moving vehicle by matching a point in the time domain that bears the same geometric relationship to the footprints of the transponders of the localized group at the current detection location as the point in the spatial domain bears with the transponders of the localized group at the current detection location.

2. A method as claimed in claim 1, wherein each said localized group comprises a pair of said transponders, and the position of the vehicle is computed by determining the midpoint between the footprints corresponding to the transponders in the pair forming the localized group at the current detection location.

3. A method as claimed in claim 1, the distances between the transponders of each localized group are constant.

4. A method as claimed in claim 1, wherein the distances between the transponders of each localized group vary and are stored in a database.

5. A method as claimed in claim 1, wherein the transponders of each localized group are spaced apart by less than ten meters.

6. A method as claimed in claim 1, wherein the point in the time domain is determined by both rising and falling edges of the footprints.

7. A guideway-mounted system for determining a position of a vehicle moving along a guideway wherein transponders are located beside a guideway such that a detector on the moving vehicle generates signals that create a footprint in a time domain corresponding to a time the vehicle is in communication with that transponder, and wherein the transponders are arranged in a plurality of localized groups spaced a known distance apart, and the localized groups are spaced substantially further apart from each other than the individual transponders within each said localized group, each localized group being located at a detection location, whereby as a vehicle moves along the guideway past a current said detection location the vehicle is able to compute an estimate of position by matching a point in a spatial domain between the transponders that bears a known geometric relationship with the transponders of the localized group at the current detection location with a point in the time domain that bears the same geometric relationship to the footprints corresponding to the transponders of the localized group at the current detection location.

8. A system as claimed in claim 7, wherein each localized group of transponders comprises a pair of said transponders.

9. A system as claimed in claim 7, the distances between the transponders of each localized group are constant.

10. A system as claimed in claim 7, wherein the distances between the transponders of each localized group vary.

11. A system as claimed in claim 7, wherein the transponders of each localized group are spaced apart by less than ten meters.

12. A vehicle-mounted system for determining a position of a vehicle moving along a guideway, comprising:

a detector for detecting signals from a plurality of localized groups of transponders located beside the guideway as the vehicle moves along the guideway, the transponders of each localized group being spaced a known distance apart from each other, and said localized groups being spaced substantially further apart from each other than the individual transponders within each said localized group, each localized group being located at a detection location, and wherein as the vehicle passes a current said detection location the signals from each transponder in the localized group at the current detection location create a footprint in a time domain corresponding to the time the vehicle is in communication with that transponder; and a processor for computing an estimate of the position of the moving vehicle by matching a point in the time domain that bears the same geometric relationship to the footprints corresponding to the transponders of the localized group at the current detection location to a point in the spatial domain between the transponders that bears a known geometric relationship with the transponders of the localized group at the current detection location.

13. A vehicle-mounted system as claimed in claim 12, wherein the point in the time domain is the midpoint between the footprints.

14. A vehicle-mounted system as claimed in claim 12, further comprising a database storing the distances between the transponders of each localized group.

15. A system for determining a position of a vehicle moving along a guideway, comprising:

localized groups of transponders located beside the guideway, the transponders of each localized group being spaced a known distance apart from each other, and said localized groups being spaced substantially further apart from each other than the individual transponders within each said localized group, each localized group being located at a detection location;

a detector on the vehicle for detecting signals from the transponders as the vehicle moves along the guideway, and wherein as the vehicles passes a current detection location the signals from each transponder in the localized group at the current detection location create a footprint in a time domain corresponding to a time the vehicle is in communication with that transponder; and:

a processor on the vehicle for computing an estimate of the position of the moving vehicle by matching a point in the time domain that bears the same geometric relationship to the footprints corresponding to the transponders of the localized group at the current detection location to a point in the spatial domain between the individual transponders that bears a known geometric relationship with the transponders of the localized group at the current detection location.

16. A system as claimed in claim 15, wherein each said localized group comprises a pair of transponders and the position of the vehicle is computed by determining the midpoint between the footprints corresponding to the transponders of the pair forming the localized group at the current detection location.

17. A system as claimed in claim 15, wherein the distances between the transponders of each localized group are constant.

18. A system as claimed in claim 15, wherein the distances between the transponders of each localized group vary and are stored in a database.

19. A system as claimed in claim 15, wherein the transponders of each localized group are spaced apart by less than ten meters.

\* \* \* \* \*